(No Model.)
H. C. WARREN.
FASTENING DEVICE.
No. 559,012.  Patented Apr. 28, 1896.
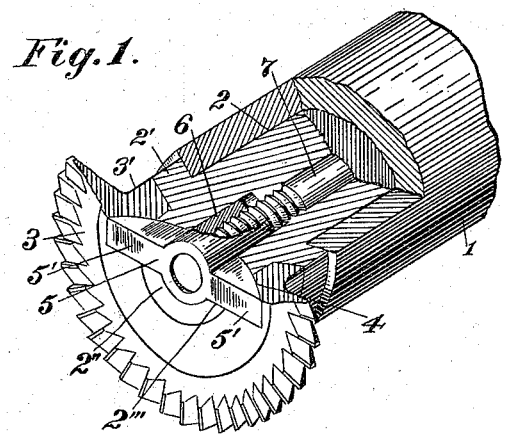
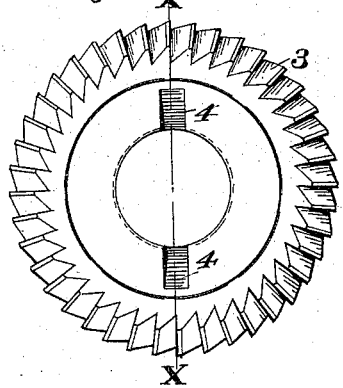
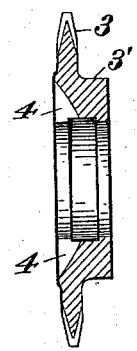
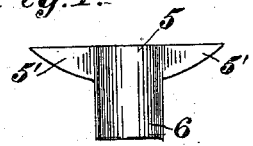
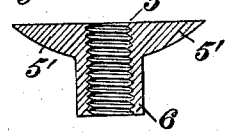
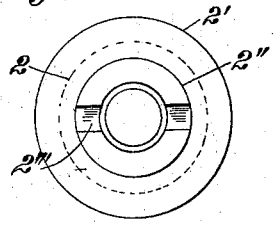
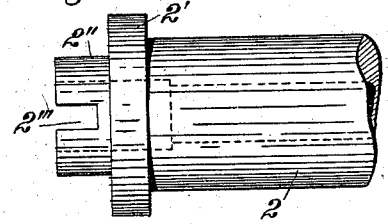
Witnesses:
R. W. Pittman.
Fred. J. Dole
Inventor:
H. C. Warren,
By his Attorney
F. H. Richards.

UNITED STATES PATENT OFFICE.

HERBERT C. WARREN, OF HARTFORD, CONNECTICUT.

FASTENING DEVICE.

SPECIFICATION forming part of Letters Patent No. 559,012, dated April 28, 1896.

Application filed November 20, 1895. Serial No. 569,546. (No model.)

*To all whom it may concern:*

Be it known that I, HERBERT C. WARREN, a citizen of the United States, residing at Hartford, in the county of Hartford and State of Connecticut, have invented certain new and useful Improvements in Fastening Devices, of which the following is a specification.

My invention relates to devices for securing a tool or other body to its arbor, shaft, or supporting means, and is illustrated as applied for fastening a milling-cutter to its arbor or shaft.

Heretofore such cutters have been secured in position by various means, generally by splining the cutter to its shaft and holding it in place by a nut or other device applied thereto and bearing against the outer face of the cutter. In many of the old constructions the securing means, when applied, constitutes a projection from the face of the cutter, which in certain classes of work is an obstruction to the proper action of the tool and also tends to catch into objects and is a source of danger to the mechanic. Furthermore, in the old constructions the cutter is not rigidly held in its true position, as it must be for fine work—such, for example, as gear-cutting—but tends to wabble or work loose on the supporting device, requiring constant tightening of the fastening means.

To obviate these and other defects is the object of my invention, which, in the preferred form thereof herein shown and described, comprises a cutter, tool, or other device having a groove in its face, preferably on a diametrical line, although in certain constructions of tool it may be differently disposed, and a fastening dog or clamp having arms or projections fitting in said groove, and, when inserted therein, preferably flush with the face of the tool. Preferably the groove is formed by an ordinary milling-cutter, and consequently has a concave or rounded bottom wall which corresponds to, receives, and fits the rounded or convex under surfaces of the arms or projections of the clamp or dog, the top surfaces of which are flush with the face of the tool when the latter is secured to its arbor or other support. It is obvious, however, that the groove may be formed in any well-known manner, or, with cast or molded tools, may be made during the casting or molding operation and may have a straight or other form of bottom, and that the arms of the clamp may be shaped to correspond to any form of said groove without departing from the spirit of my invention.

In the accompanying drawings, forming part of this application, Figure 1 is a perspective view of my invention, showing the parts mounted on a spindle or arbor. Fig. 2 is a plan view of the face of the cutter. Fig. 3 is a vertical section on the line $x\ x$, Fig. 2. Figs. 4, 5, and 6 are detail views of the fastening devices; and Figs. 7 and 8 are respectively an end view and a side elevation of the shaft or arbor.

Similar characters represent like parts in all the figures of the drawings.

The numeral 1 represents a bearing of a frame or other suitable structure in which the spindle, arbor, or other device 2, to which the tool 3, having the usual hub 3', is to be secured, is mounted.

The numeral 4 represents a preferably concave seat or depression in the face of the tool, the parts of said depression being separated by the bore thereof, although such depression may be of other suitable form, as above stated.

Arbor or spindle 2 is preferably provided with an enlargement or collar 2', for a purpose hereinafter stated, and with a reduced end portion 2'', having a slot or recess 2'''.

The numeral 5 represents a fastening dog or clamp provided with projections or wings 5' and preferably with a tubular internally-threaded stem or extension 6, or such stem may be externally threaded or formed in any way to be attached to a securing means. Wings or projections 5' are preferably of a curved or convex outline on their under sides to conform to and fit the recess or depression 4 in the tool, but they may be straight or of other form to suit the character of the depression employed.

The numeral 7 represents a rod passing through spindle 2, and shown as externally threaded to engage the threaded bore of the fastening device, or it may be engaged with said device in any other approved manner. Rod 7 is to be provided with a head, nut, or other suitable device by which it may be operated or moved longitudinally to secure the tool in position or release it therefrom.

In assembling the parts, a tool, either with or without a hub, is slipped over the reduced end 2" of the supporting device 2. The dog or clamp 5 is then inserted into the bore of the tool and its wings or projections are seated in depression 4 and slot or kerf 2''' in the end of the supporting device 2. Rod 7 is then connected with the dog or clamp and is operated to force the same into rigid engagement with the cutter and supporting device.

By providing the supporting device 2 with slot 2''' a positive engagement of the parts is effected and the tool is incapable of independent movement when seated. It is obvious, however, that under certain circumstances the slot 2'' could be omitted and the tool be tightly held in frictional engagement with the collar 2', if deemed necessary, but I prefer to secure it both frictionally and positively in the manner above set forth, as by this means the tool cannot possibly slip, and consequently will always be rigidly secured in position.

When the recess or depression 4 is formed with a curved bottom, it can be readily made by an ordinary milling-tool, thus cheapening the construction.

By so proportioning the parts that the clamp or dog will sink in the recess or depression until its top surface is flush with the surface of the disk or tool all obstructions are removed and the device is given a mechanical finish both pleasing to the eye and effective in purpose.

Without limiting my invention to any particular tool, device, or cutter to be secured to a support, what I claim as new, and desire to secure by Letters Patent, is—

1. In combination with a support and a tool mounted on the end thereof, said tool being provided with a groove in its face; a dog or clamp provided with projecting wings fitted in said groove, and having a threaded projection whereby it may be secured to the support.

2. In combination with a suitable support and a tool of the character described carried thereby, said tool having a diametrical groove or depression in its face; a dog or clamp having projections seated in said groove; and means carried by the support for rigidly securing the devices in position.

3. In combination with a suitable support and a tool carried thereby; a dog or clamp with internally-threaded stem having projections interlocked with the support and serving to secure the tool in position.

4. In combination with a shaft having a slotted end, and a tool having a recessed or grooved face; a dog or clamp having lateral wings seated in said groove and fitting in the slot of the shaft; a threaded extension to said dog; and a threaded rod carried by the shaft and engaging said extension.

5. In combination with a shaft having a reduced end, with a slot or groove therein; a tool provided with a groove having a curved bottom; a dog or clamp having a flat upper surface, and a convex lower surface seated in said groove with its upper surface flush with the face of the tool; and means engaging said dog to fasten the tool in position.

6. A tool of the character described having a diametrical groove with rounded bottom in its face, in combination with a device seated in said groove and serving to secure the same to a support.

7. A tool of the character described having a diametrical groove with a curved bottom; in combination with a device having a convex wall seated in said groove and serving to secure the tool to a support.

8. A milling-cutter having the usual hub and bore, and a transverse groove with curved bottom in its face, substantially as and for the purpose specified.

9. In a device for securing a milling-cutter in position, the combination with a tubular shaft or arbor having an enlarged portion or collar, a reduced end and a slot or groove in such end; of a cutter provided with a concave groove or depression; a clamping-dog having its under surface corresponding to such groove or depression, and provided with a tubular, internally-threaded extension; and a rod mounted in said shaft and having a threaded end engaging such extension.

10. A milling-cutter having a concave groove in its face on each side of its bore; an internally-threaded clamp with convex wings seated in said groove; and means for securing the clamp and cutter in position.

HERBERT C. WARREN.

Witnesses:
FRED. J. DOLE,
HENRY BISSELL.